(12) United States Patent
Ramaswami et al.

(10) Patent No.: US 10,237,623 B2
(45) Date of Patent: Mar. 19, 2019

(54) LIMITED CHAIN RELAY WITH VIRTUAL PEER FOR MULTIMEDIA DISTRIBUTION

(71) Applicant: AT&T Intellectual Property I, L.P., Atlanta, GA (US)

(72) Inventors: Vaidyanathan Ramaswami, Branchburg, NJ (US); Rittwik Jana, Parsippany, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/654,474

(22) Filed: Jul. 19, 2017

(65) Prior Publication Data

US 2017/0318354 A1    Nov. 2, 2017

Related U.S. Application Data

(63) Continuation of application No. 15/165,350, filed on May 26, 2016, now Pat. No. 9,749,702, which is a
(Continued)

(51) Int. Cl.
| | |
|---|---|
| H04N 7/173 | (2011.01) |
| H04N 21/63 | (2011.01) |
| H04N 21/24 | (2011.01) |
| H04L 12/46 | (2006.01) |
| H04N 21/239 | (2011.01) |
| H04N 21/438 | (2011.01) |

(Continued)

(52) U.S. Cl.
CPC ....... *H04N 21/632* (2013.01); *H04L 12/4641* (2013.01); *H04N 21/2393* (2013.01); *H04N 21/2402* (2013.01); *H04N 21/438* (2013.01); *H04N 21/44245* (2013.01); *H04N 21/64738* (2013.01)

(58) Field of Classification Search
CPC .................................................. H04N 21/2402
See application file for complete search history.

(56) References Cited

U.S. PATENT DOCUMENTS

| 7,325,073 B2 | 1/2008 | Shao et al. |
| 2005/0055718 A1 | 3/2005 | Stone |

(Continued)

OTHER PUBLICATIONS

Non-Final Office Action for U.S. Appl. No. 12/636,715, received from the United States Patent and Trademark Office (USPTO) dated Feb. 1, 2012., 24 pages.

(Continued)

*Primary Examiner* — Joshua D Taylor
(74) *Attorney, Agent, or Firm* — Toler Law Group, PC

(57) ABSTRACT

A method includes evaluating a bandwidth capacity of an uplink between a first customer premises equipment device and a network node of a multimedia distribution network. The method includes transmitting a portion of multimedia content from the first customer premises equipment device to a second customer premises equipment device. The method includes, responsive to determining that the bandwidth capacity of the uplink is greater than a threshold, determining a number of subsequent requestors that the first customer premises equipment device is capable of servicing, selecting a first set of helper virtual peers from a pool of available helper virtual peers based on the number of subsequent requestors, and transmitting the multimedia content from the first customer premises equipment device to the first set of helper virtual peers.

20 Claims, 10 Drawing Sheets

Related U.S. Application Data continuation of application No. 13/654,902, filed on Oct. 18, 2012, now Pat. No. 9,379,908, which is a continuation of application No. 12/636,715, filed on Dec. 12, 2009, now Pat. No. 8,321,900.

(51) Int. Cl.
*H04N 21/442* (2011.01)
*H04N 21/647* (2011.01)

(56) References Cited

U.S. PATENT DOCUMENTS

| | | |
|---|---|---|
| 2006/0190615 A1 | 8/2006 | Panwar et al. |
| 2007/0101377 A1 | 5/2007 | Six et al. |
| 2007/0250880 A1 | 10/2007 | Hainline |
| 2008/0059631 A1 | 3/2008 | Bergstrom et al. |
| 2008/0080392 A1 | 4/2008 | Walsh et al. |
| 2010/0274885 A1 | 10/2010 | Yoo et al. |
| 2011/0145870 A1 | 6/2011 | Ramaswami et al. |

OTHER PUBLICATIONS

Notice of Allowance and Fee(s) Due for U.S. Appl. No. 12/636,715 received from the United States Patent and Trademark Office (USPTO) dated Jul. 30, 2012., 35 pages.

LIMITED CHAIN RELAY WITH VIRTUAL PEER FOR MULTIMEDIA DISTRIBUTION

CLAIM OF PRIORITY

The present application is a continuation of, and claims priority to, U.S. patent application Ser. No. 15/165,350, filed on May 26, 2016, which is a continuation of U.S. patent application Ser. No. 13/654,902, filed on Oct. 18, 2012, now issued as U.S. Pat. No. 9,379,908, which is a continuation of U.S. patent application Ser. No. 12/636,715, filed on Dec. 12, 2009, now issued as U.S. Pat. No. 8,321,900; each of which is incorporated herein by reference in its entirety.

FIELD OF THE DISCLOSURE

The present disclosure is generally related to providing a limited chain relay with at least one virtual peer for multimedia distribution.

BACKGROUND

Multimedia content distribution networks encompass conventional cable, satellite, and wired and wireless packet-switched networks including peer-to-peer (P2P) networks. The bandwidth required to transmit multimedia content, such as video-on-demand (VOD), can be especially taxing on bandwidth limitations inherent in content distribution networks. Existing techniques for distributing on-demand content and other types of multimedia content include multicasting, unicasting, distributed caching, and P2P striping.

DETAILED DESCRIPTION

Figure 1:
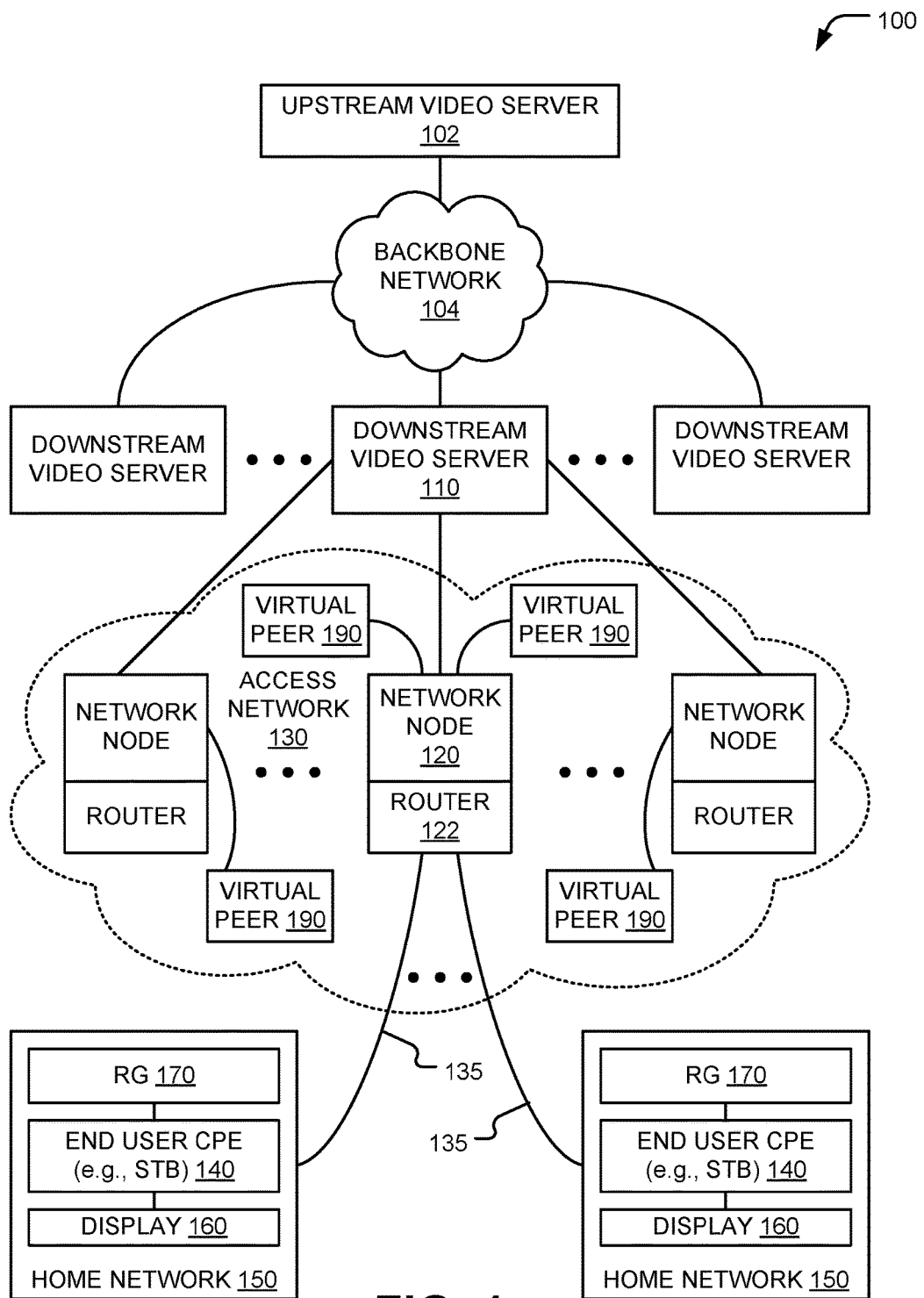
FIG. 1 is a block diagram of a particular embodiment of a multimedia content distribution network.

The various embodiments disclose a system and method to provide a limited chain relay (LCR) with at least one virtual peer for multimedia distribution. A set of virtual peers may be provided at a network node of a multimedia distribution network. One or more virtual peers may be coupled to one or more network nodes of the multimedia distribution network. The storage capacity and the uplink capacity of one or more of the virtual peers may be used in the distribution of multimedia content. The set of virtual peers may implement the limited chain relay (LCR) functions of peer storage and uploading to a peer and related control functions so that the whole scheme is under the control of the multimedia distribution network. This may eliminate uncertainties related to peer availability, peer storage availability, and peer uplink bandwidth capability that may be present in a peer-to-peer (P2P) implementation of an LCR algorithm.

In a particular embodiment, a method is disclosed that includes, at a first customer premises equipment (CPE) device coupled to a multimedia distribution network, generating a first request for multimedia content. The method also includes sending the first request to a network node of the multimedia distribution network. The method further includes receiving the multimedia content from a virtual peer located at the network node and storing the multimedia content at the first CPE device. The method also includes receiving a message via the multimedia distribution network, the message indicating a transmission of a second request for the multimedia content by a second customer premises equipment (CPE) device. The method further includes transmitting at least a portion of the stored multimedia content to the second CPE device.

In another particular embodiment, a customer premises equipment (CPE) device suitable for use in a multimedia content distribution network is disclosed. The CPE device includes a processor and a computer readable storage medium accessible to the processor. The CPE device also includes a network interface for receiving multimedia content. The CPE device further includes a decoder for processing the multimedia content received via the network interface. The computer readable storage medium includes instructions comprising a limited chain relay (LCR) application. The LCR application generates a first request for the multimedia content and sends the first request to a virtual peer via a network node of the multimedia content distribution network, where the network node is coupled to a server. The LCR application receives the multimedia content from the virtual peer via the network node and stores the received multimedia content. The LCR application receives a message indicating a transmission of a second request for the multimedia content by second customer premises equipment (CPE). In response to receiving the message, the LCR application transmits at least a portion of the stored multimedia content to the second CPE device via the network node.

In another particular embodiment, a network node suitable for use in a multimedia content distribution network is disclosed. The network node includes a processor and a computer readable storage medium accessible to the processor. The network node also includes a network interface for receiving multimedia content. The computer readable storage medium includes instructions comprising a limited chain relay (LCR) distribution application. The LCR distribution application determines a beginning and ending of successive LCR time intervals. In response to detecting a first request during a first LCR time interval, where the first request is for the multimedia content, the LCR distribution application transmits at least a portion of the multimedia content to a first customer premises equipment (CPE) device. In response to detecting a second request during the first LCR time interval, where the second request is also for the multimedia content, the LCR distribution application sends a message to the first CPE device instructing the first CPE device to transmit at least a portion of the multimedia content from the first CPE device to a second customer premises equipment (CPE) device.

Referring to FIG. 1, a block diagram of selected elements of a particular embodiment of a multimedia content distribution network is depicted and generally designated 100. The multimedia content distribution network 100 exhibits a hierarchical architectural arrangement with an upstream video server (UVS) 102 residing at the hierarchical "top" of the multimedia content distribution network 100. The UVS 102 includes resources to acquire, process, and transmit broadcast content and video-on-demand (VOD) content. As depicted in FIG. 1, the UVS 102 represents the primary acquisition and aggregation resource for national interest programming. In some embodiments, the UVS 102 serves as a super headend office (SHO).

The UVS 102 may distribute acquired content via a backbone network 104 to one or more downstream video servers (DVSs) 110. The DVSs 110 represent video distribution points within each designated market area (DMA). In some embodiments, each DMA may be served by a corresponding DVS 110. In some embodiments, the UVS 102 unicasts or otherwise transmits VOD content to all DVSs 110. The DVSs 110 may include their own content acquisition resources, and the DVSs 110 may serve as acquisition resources for regional or local content including advertising, local broadcast channels, municipal channels, and the like. In some embodiments, one or more of the DVSs 110 may be implemented as a video hub office (VHO).

The multimedia content distribution network 100 further includes downstream network nodes (DNNs) 120 located downstream of the DVSs 110, between the DVSs 110 and end user customer premises equipment (CPE) devices or CPE devices 140. The physical network connecting the CPE devices 140 to the DNN 120 is referred to as the access network 130, which includes "last mile" links 135. The last mile links 135 may include DSL-compliant unshielded twisted pair copper, fiber optic cables, or a combination of both. Other embodiments of the multimedia content distribution network 100 may employ intermediate offices (not shown) between the DNNs 120 and the DVSs 110 to reduce the number of direct connections to any one of the DVSs 110. In an alternative embodiment, the CPE devices 140 may be connected to the DNN 120 wirelessly, with the DNN 120 corresponding to a cell tower or some node above the cell tower.

The multimedia content distribution network 100 also includes one or more virtual peers (VPs) 190. The VPs 190 may be located at the DNNs 120 and may be coupled to the DNNs 120, as shown in FIG. 1. The VPs 190 provide similar functionality to the functionality provided by the CPE devices 140, which are also known as peers. Like a peer, a VP may implement the limited chain relay (LCR) functions of storage of multimedia content and of uploading the stored multimedia content to a peer upon request by the peer. A VP may have greater storage capacity than a peer and may have greater uplink capacity than a peer. Like a peer, a VP may serve as a "helper" in an implementation of an LCR algorithm. Unlike a peer, a VP may not request a particular program of multimedia content (PMC) and may not decode or display the PMC.

In some embodiments, the DNNs 120 may include packet routing capability, such as the packet routing capability that would be found in a conventional router of an IP-based network. In this case, multimedia content may be transferred between network elements that are downstream of the DNNs 120 including, for example, between the CPE devices 140, without invoking media delivery services of the DVSs 110 or any network element upstream of the DVSs 110. The DNNs 120 shown in FIG. 1 include packet routing resources or routers 122 that support packet routing.

Depending on the implementation, the DNN 120 may represent a central office (CO) or a digital subscriber line access multiplexer (DSLAM) connected to a CO. In a DSLAM implementation of the DNN 120, the DSLAM may include the routers 122. In other embodiments, the routers 122 comprise a portion of a CO. In either of these embodiments, communication between the CPE devices 140 consumes bandwidth and resources downstream of the CO but does not consume bandwidth or resources upstream of the CO.

When an access network 130 includes a fiber-to-the-home access network, the DNN 120 may represent a CO and the last mile link 135 may represent a passive optical network (PON) that connects directly to an end user's CPE device 140. Alternatively, in a fiber to the node (FTTN) deployment, fiber connections connect the COs with the DSLAMs while unshielded twisted copper pairs connect the DSLAMs to the CPE devices 140. The DNN 120 represents the most-downstream network node that incorporates the routers 122, whether that node is a CO, a DSLAM, or another type of network node.

The CPE devices 140 as shown in FIG. 1 represent an element of a home network 150 portion of the multimedia distribution network 100. In a particular embodiment, the home network 150 includes a residential gateway (RG) 170 including a digital subscriber line (DSL) modem suitable for use in FTTN implementations of the access network 130. In fiber to the premises (FTTP) implementations of the access network 130 (not shown), the home network 150 may include an optical-to-Ethernet network termination (ONT).

The RG 170 provides a managed interface between the CPE device 140 and services delivered over the network infrastructure. The RG 170 may also implement a session initiation protocol (SIP) client for voice over IP (VoIP) service. The RG 170 may terminate the broadband connections and route traffic to local area network (LAN) devices on the premises. IP services in the home may be accessed via the RG 170. Networking within the home may use different technologies including, as examples, Ethernet over COAX, Ethernet over home phone-line network alliance (HPNA), wired (802.3), and wireless (802.11a/b/g).

The bandwidth available on each last mile link 135 is dependent upon the implementation. In an FTTN implementation as shown in FIG. 1, assuming the RG 170 has sufficient disc space (e.g., 100 Gigabytes or Gbytes), typical multimedia streaming rates are 2 Megabits per second or Mbps for standard definition (SD) and 6.5 Mbps for high definition (HD). A VOD asset is streamed at a minimum of the SD rate. A DSLAM may support up to 200 homes. The farther a home is from the DSLAM, the lower its observed bandwidth. Implementing a configuration that supports two HD channels, two SD channels, one high speed internet data channel (6 Mbps) and one VoIP channel (2 Mbps) may be accomplished with a 25 Mbps link.

In some embodiments, video services are provided by the end user CPE device 140. The CPE device 140 may represent a standalone set-top box device (STB) connected to a television or display device 160. In other embodiments, the CPE device 140 may be integrated into the RG 170, the display 160, or any combination thereof. The CPE device 140 processes multimedia content and renders the multimedia content for display on the display 160.

An example representative of the above architecture is a service where a VHO serves a set of COs that are each coupled to several DSLAMs. Each DSLAM serves a multitude of homes, each of which has a STB connected to one or more television sets. In this architecture, videos are transmitted to the DSLAM over fiber and then by the DSLAM to the home STB using asymmetric digital subscriber lines (ADSL) over a twisted pair of copper. The transmission to the home occurs over a downlink data channel (Down Link), while requests for video and other control data are sent from the home STB to the VHO via an uplink channel (Up Link). The downlink is shared by a variety of applications such as broadcast video, VOD, and data. The uplink is similarly shared by various control data (for example, VOD requests) and user data (data, still pictures, user's video clips, and the like).

Specific challenges in the area of video distribution are the available uplink and downlink capacities and rates in the access portion of the network (e.g., the access network 130 of FIG. 1). This is the section of the network between the video server and the CPE device. In most architectures, the uplink rate is significantly smaller than the downlink rate.

In addition to the link constraints, some embodiments consider the available storage capacity and other storage restrictions at the digital video recorder (DVR) which may be used by the consumer for recording both broadcast video as well as VOD content. The content distribution techniques disclosed herein may also use that recording capacity to support other consumers' need for the multimedia content. Depending on the implementation and subject to copyright restrictions, either all or only a portion of the multimedia content may be stored in the CPE device. The content distribution techniques disclosed herein may encompass multimedia content distribution approaches that do not permit or necessarily require the receiver to store the entire multimedia content.

In various embodiments, one or more of the VPs 190 may be coupled to one or more of the DNNs 120 of the multimedia distribution network 100. The storage capacity and the uplink capacity of the VPs 190 may be used in the distribution of multimedia content. The VPs 190 may implement the limited chain relay (LCR) functions of peer storage and uploading to a CPE device 140 and related control functions so that the LCR algorithm is under the control of the multimedia distribution network 100. This may eliminate uncertainties related to CPE device 140 availability, CPE device 140 storage availability, and CPE device 140 uplink bandwidth capability that may be present in a peer-to-peer (P2P) implementation of an LCR algorithm.

Figure 2:
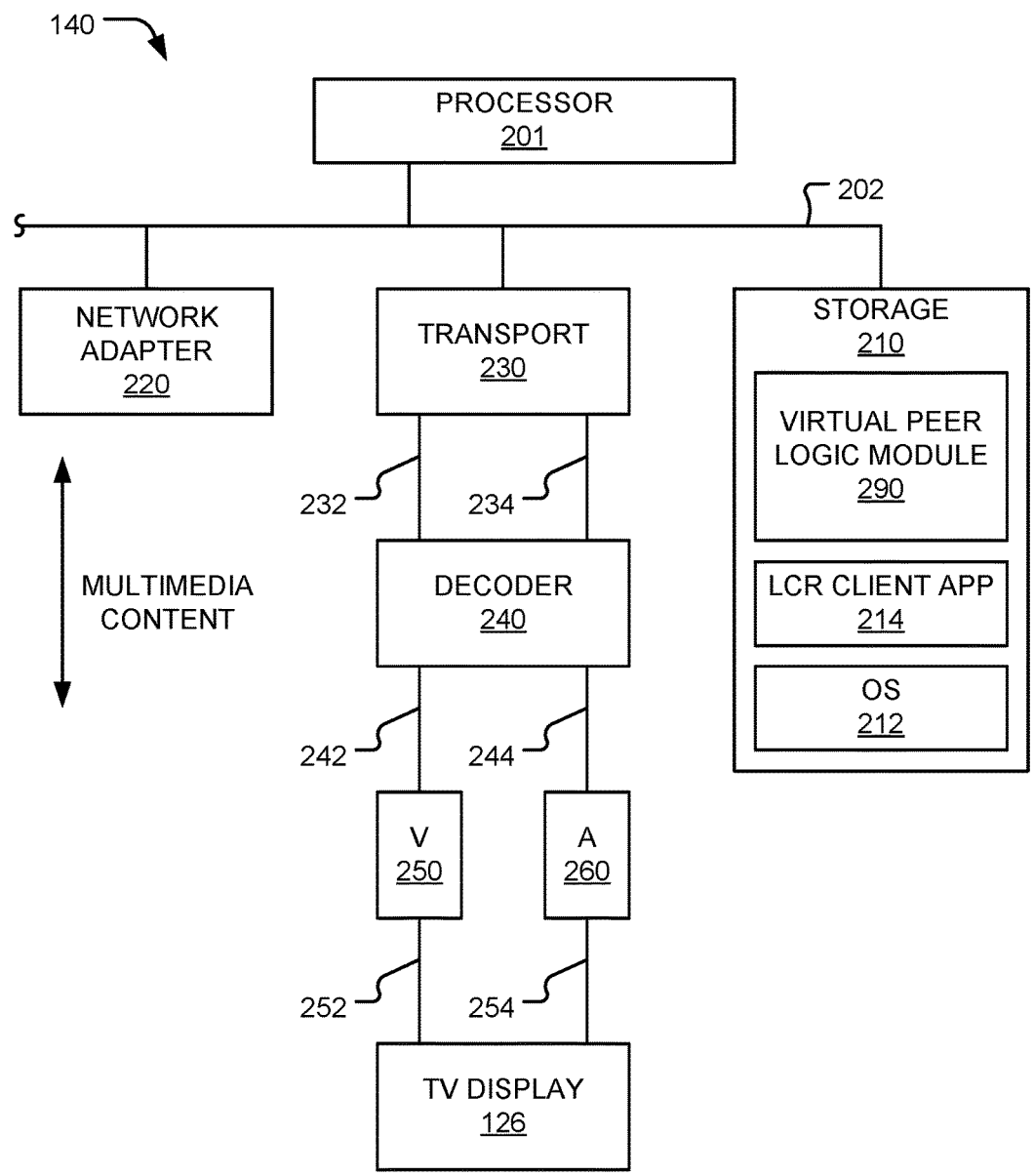
FIG. 2 is a block diagram of a particular embodiment of a customer premises equipment (CPE) device.

Referring to FIG. 2, a block diagram of selected elements of a particular embodiment of the CPE device 140 of FIG. 1 is depicted. The CPE device 140 includes a processor 201 coupled via a shared bus 202 to storage media collectively identified as storage 210. The processor 201 may be a general purpose microprocessor such as an x86 type processor. In other embodiments, the processor 201 may be implemented with any of various, commercially distributed embedded processors. The storage 210 encompasses persistent and volatile media, fixed and movable media, and magnetic and semiconductor media. The storage 210 is operable to store instructions, data structures, or any combination thereof. Sets of instructions stored in the storage 210 may be referred to as computer programs, application programs, software, and other terms that will be familiar to skilled artisans. Moreover, although the storage 210 is shown in FIG. 2 as an element of the CPE device 140, the storage 210 may include portions that are distributed, network hosted, or otherwise remotely located from the CPE device 140.

The CPE device 140 as shown in FIG. 2 further includes a network adapter 220 through which the CPE device 140 receives and transmits multimedia content. In embodiments employing IP-based networks, multimedia content may be delivered to the CPE device 140 as a series of IP-compliant packets. In other embodiments, including digitally modulated cable-based embodiments of the access network 130 of FIG. 1, the multimedia content may be modulated into a particular frequency band and transported simultaneously with multimedia content from other "channels," which are modulated into their own respective carrier bands.

The CPE device 140 includes a decoder 240. Multimedia content may be digitally compressed, encrypted, modulated, packetized, or otherwise formatted as it is received from the access network 130 of FIG. 1. The decoder 240 is configured to process incoming multimedia content to generate a native format video stream 242 and audio stream 244. For use with IP-based implementations of the access network 130, the decoder 240 may include transport/demultiplexing resources 230 to convert a series or set of IP-compliant packets into a video stream 232 and an audio stream 234. For use with cable-based embodiments of the access network 130, the decoder 240 may include one or more tuners to extract a desired stream of multimedia content by filtering a desired frequency band.

The decoder 240 is further configured to decrypt, descramble, decompress, or any combination thereof, multimedia content to generate native format video stream 242 and audio stream 244. The decompression performed by the decoder 240 may comply with any of various video compression/decompression algorithms including, as examples, algorithms suitable for use with any of the H.264, Motion Picture Expert Group (MPEG), or Windows® Media Video (WMV) compression formats including, as examples, MPEG-2, MPEG-4, WMV 7, WMV 8, and WMV 9. Similarly, the decoder 240 may employ any of various audio decoding algorithms including Dolby® Digital, Digital Theatre System (DTS) Coherent Acoustics, Advanced Audio Coding (AAC), MP3, and Windows® Media Audio (WMA).

The native format video stream 242 and audio stream 244 shown in FIG. 2 may be processed by encoders/digital-to-analog converters (encoders/DACs) 250 and 260 respectively to produce analog video signal 252 and audio signal 254 in a format compliant with television/display 126. The television/display 126 may comply with a National Television Systems Committee (NTSC) standard, a Phase Alternating Line (PAL) standard, or any other suitable television standard.

The storage 210 shown in FIG. 2 includes software in the form of an operating system (OS) 212, an LCR client application (LCR client app) 214, and a virtual peer (VP) logic module 290. The OS 212 may represent a Unix or Unix-like operating system, a Windows® family operating system, or another suitable operating system. In some embodiments, the LCR client application 214 includes instructions that, when executed, cause at least one of the CPE devices 140 to receive multimedia content from at least one of the VPs 190 of FIG. 1 and cause two or possibly more of the CPE devices 140 to deliver multimedia content from at least one of the CPE devices 140 to at least one other of the CPE devices 140. In some embodiments, the delivery of multimedia content takes place entirely over a portion of the multimedia distribution network 100 of FIG. 1 that is downstream of the DNNs 120. In some embodiments, the LCR client application 214 generates a first request for the multimedia content and sends the first request to the VP 190 via the DNN 120 of the multimedia content distribution network 100. The LCR client application 214 receives the multimedia content from the VP 190 via the DNN 120 and stores the received multimedia content, receives a message indicating a transmission of a second request for the multimedia content by a second CPE device 140, and, in response to receiving the message, transmits at least a portion of the stored multimedia content to the second CPE device 140 via the DNN 120.

In some embodiments, the VP logic module 290 includes instructions that, when executed, cause the CPE device 140 to receive multimedia content from one or more of the VPs 190 of FIG. 1. The VP logic module 290 coordinates the interactions of the CPE device 140 with one or more of the VPs 190. In alternative embodiments, the LCR client application 214 may be included in the VP logic module 290.

Figure 3:
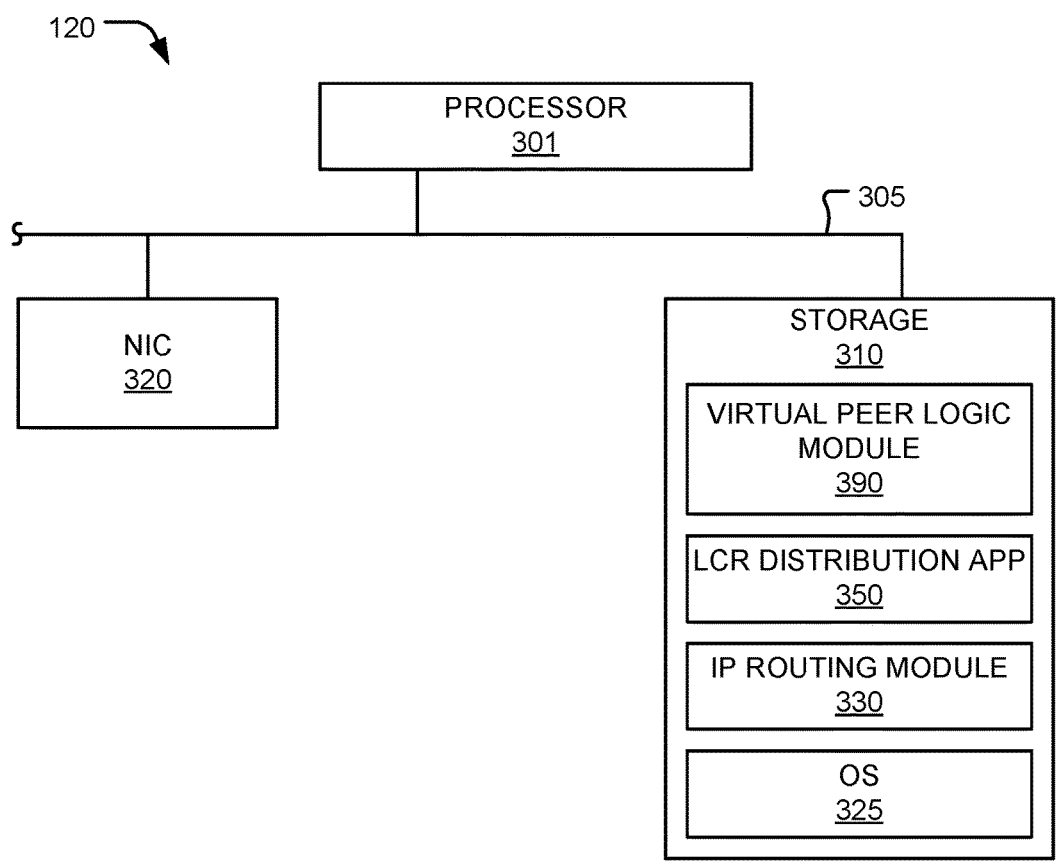
FIG. 3 is a block diagram of a particular embodiment of a network node.

Referring to FIG. 3, a block diagram of selected elements of a particular embodiment of the DNN 120 of FIG. 1 is depicted. The DNN 120 includes a processor 301, storage media identified as storage 310, and a network interface adapter or NIC 320. The processor 301 and the NIC 320 connect to a shared bus 305 that provides access to the storage 310. The storage 310 encompasses persistent and volatile media, fixed and removable media, and magnetic, optical, and semiconductor media. The storage 310 may include database structures, processor executable instructions, or any combination thereof. The instructions embedded or otherwise stored in the storage 310 include an operating system (OS) 325, an LCR distribution application 350, and a VP logic module 390. The OS 325 may be a Unix or Unix-like operating system, a Windows® family operating system, or another suitable type of operating system.

The LCR distribution application 350 determines a beginning and ending of successive LCR time intervals. In response to detecting a first request during a first LCR time interval, where the first request is for multimedia content, the LCR distribution application 350 transmits at least a portion of the multimedia content from a VP 190 to the first CPE device 140. In response to detecting a second request during the first LCR time interval, where the second request is also for the same multimedia content, the LCR distribution application 350 sends a message to the first CPE device 140 instructing the first CPE device 140 to transmit at least a portion of the multimedia content from the first CPE device 140 to the second CPE device 140. Although the LCR distribution application 350 is shown in FIG. 3 as residing in the storage 310 of the DNN 120, all or portions of the LCR distribution application 350 may be stored on, downloaded to, and/or executed on another network resource including the DVS 110, the UVS 102, or elsewhere. The VP logic module 390 coordinates the interactions of the DNN 120 with one or more of the VPs 190. In alternative embodiments, the LCR distribution application 350 may be included in the VP logic module 390. The DNN 120 further includes an IP-routing module 330 suitable for implementing an IP-compliant routing mechanism.

Figure 4:
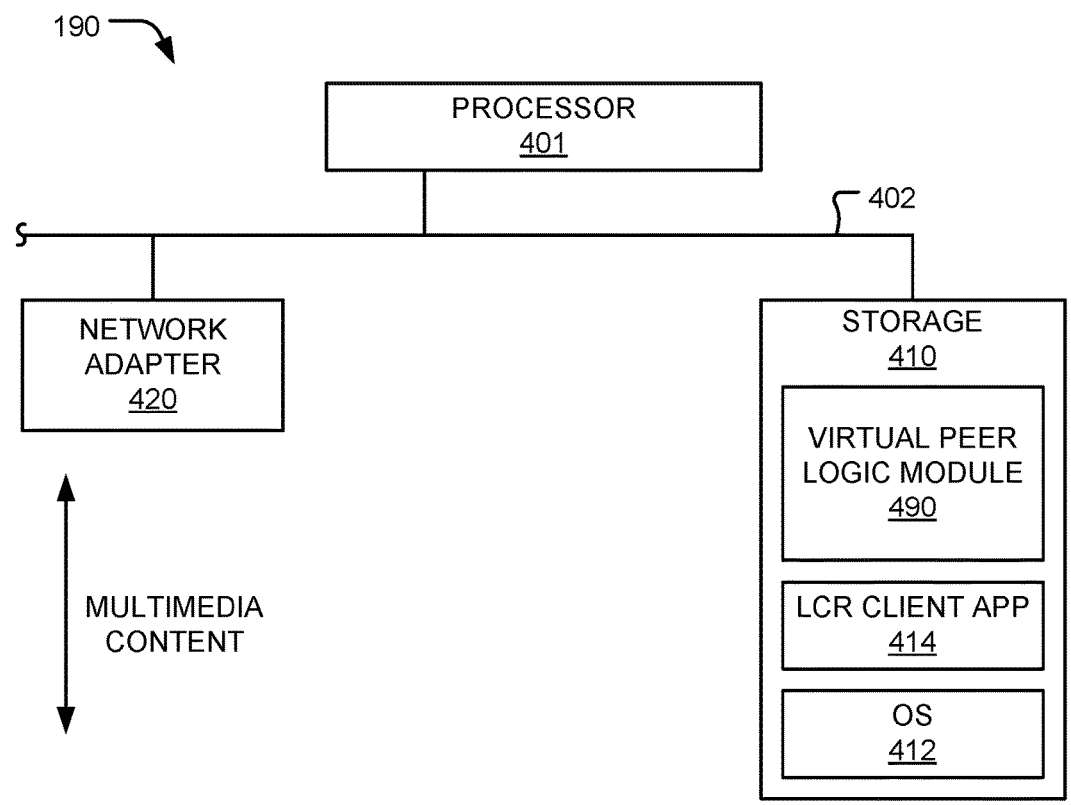
FIG. 4 is a block diagram of a particular embodiment of a virtual peer.

Referring to FIG. 4, a block diagram of selected elements of a particular embodiment of the VP 190 of FIG. 1 is depicted. The VP 190 includes a processor 401 coupled via a shared bus 402 to storage media collectively identified at storage 410. The processor 401 may be a general purpose microprocessor such as an x86 type processor. In other embodiments, the processor 401 may be implemented with any of various, commercially distributed embedded processors. The storage 410 encompasses persistent and volatile media, fixed and movable media, and magnetic and semiconductor media. The storage 410 is operable to store instructions, data structures, or any combination thereof. Sets of instructions stored in the storage 410 may be referred to as computer programs, application programs, software, and other terms that will be familiar to skilled artisans. Moreover, although the storage 410 is shown in FIG. 4 as an element of the VP 190, the storage 410 may include portions that are distributed, network hosted, or otherwise remotely located from the VP 190.

The VP 190 as shown in FIG. 4 further includes a network adapter 420 through which the VP 190 receives and transmits multimedia content. In embodiments employing IP-based networks, multimedia content may be delivered to the VP 190 as a series of IP-compliant packets. In other embodiments, including digitally modulated cable-based embodiments of the access network 130 of FIG. 1, the multimedia content may be modulated into a particular frequency band and transported simultaneously with multimedia content from other "channels," which are modulated into their own respective carrier bands.

The storage 410 shown in FIG. 4 includes software in the form of an operating system (OS) 412, an LCR client application (LCR client app) 414, and a virtual peer (VP) logic module 490. The OS 412 may represent a Unix or Unix-like operating system, a Windows® family operating system, or another suitable operating system. In some embodiments, the LCR client application 414 includes instructions that, when executed, cause two or possibly more of the CPE devices 140 and/or the VPs 190 to deliver multimedia content from at least one of the CPE devices 140 and/or the VPs 190 to at least one other of the CPE devices 140 and/or the VPs 190. In some embodiments, the delivery of multimedia content takes place entirely over a portion of the multimedia distribution network 100 of FIG. 1 that is downstream of the DNNs 120. The LCR client application 414 receives the multimedia content from a server, such as the DVS 110. The LCR client application 414 stores the multimedia content in the storage 410, receives a first request for multimedia content by a first CPE device 140, and transmits the multimedia content to the first CPE device 140.

In some embodiments, the VP logic module 490 includes instructions that, when executed, cause the VP 190 to transmit multimedia content to one or more of the CPE devices 140 and/or the VPs 190. The VP logic module 490 coordinates the interactions of each one of the VPs 190 with one or more of the other VPs 190, with the CPE devices 140, and with the DNNs 120. In alternative embodiments, the LCR client application 414 may be included in the VP logic module 490. Implementing the LCR algorithm using the VPs 190 helps prevent some of the drawbacks of a P2P distribution using an LCR algorithm. The P2P distribution using an LCR algorithm relies on peers, such as the CPE devices 140, to store portions of multimedia content and to transmit the stored portions to other peers. However, reliance on peers in the P2P scheme involves limitations such as limited peer uplink bandwidth, peer storage needs, the impact of peer failures, and lack of transparency. The storage capacity and the uplink capacity of the VPs 190 may be used in the distribution of multimedia content. The VPs 190 may implement the LCR functions of peer storage and uploading to a peer and related control functions so that the LCR algorithm is under the control of the multimedia distribution network 100. Use of network resources to function as virtual peers may eliminate uncertainties related to peer availability, peer storage limitations, and peer uplink bandwidth restraints that may be present in a P2P implementation of an LCR algorithm. A VP implementation of an LCR algorithm increases reliability because the VPs 190 may be centrally powered and users may not affect the downtime of the VPs 190. In an alternative embodiment where local access is through a wireless network, in addition to link capacities, signal quality (error rates) and signal strength may also play a role in limiting a P2P implementation of an LCR algorithm, whereas a VP implementation of an LCR algorithm may be less affected by considerations of signal quality (error rates) and signal strength.

Figure 5:
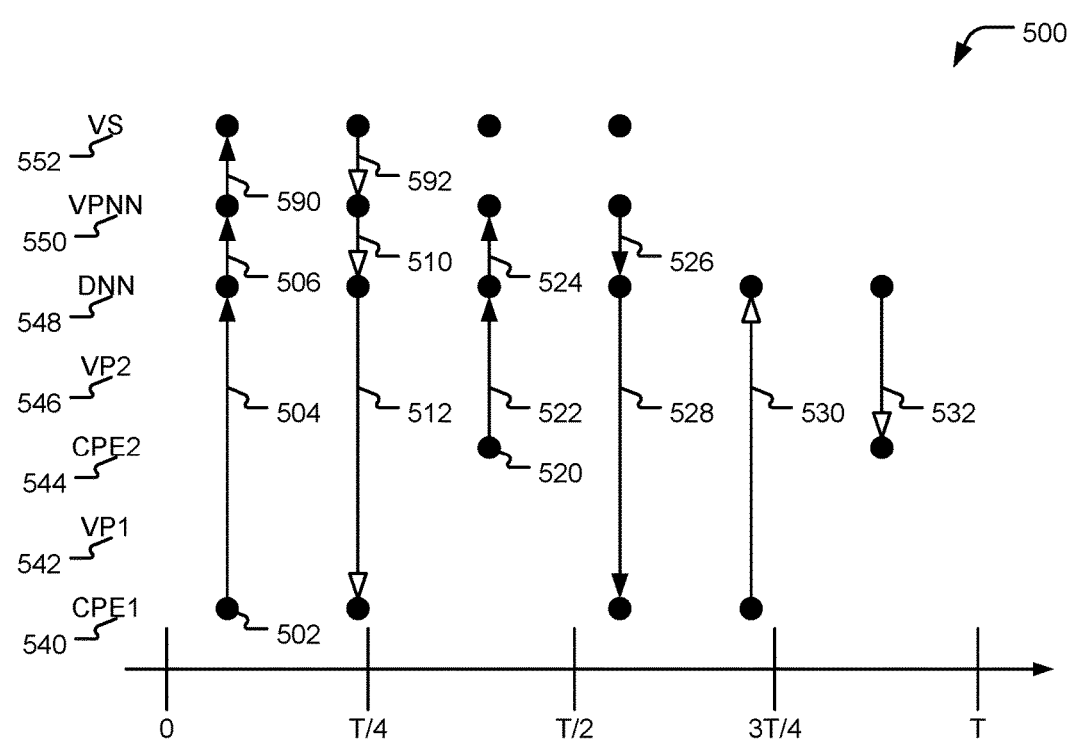
FIG. 5 depicts an embodiment of limited chain relay (LCR) distribution having a virtual peer at a network node.

Referring to FIG. 5, an illustration of limited chain relay (LCR) distribution not involving a helper virtual peer (VP) is depicted and generally designated 500. A helper VP is a VP that helps transfer multimedia content from one CPE device to another CPE device. In FIG. 5, lines terminating in black arrowheads represent message transfers while lines terminating in white arrowheads represent multimedia content transfers. In the sequence 500, CPE1 540, which is the CPE device of a first end user or first requestor, generates a content request at 502 for a particular program of multimedia content (PMC). The content request at 502 is the first content request that has occurred during the current LCR interval of duration T and occurs before T/4. The content request is transmitted 504 through an intervening DNN 548 and sent 506 through a VP located at the network node (VPNN) 550 and forwarded 590 to a video server (VS) 552.

The VS 552 recognizes the content request as the first request for the PMC within the LCR interval and responds by transmitting the PMC to the CPE1 540 through the intervening VPNN 550 and DNN 548, as represented by the arrows 592, 510, and 512. At the end of this portion of the sequence 500, also before T/4, the CPE1 540 has stored all or some of the PMC.

When a subsequent request for the PMC is issued by CPE2 544, which is the CPE device of a second end user or second requestor, at 520, the subsequent request is transmitted through the DNN 548 to the VPNN 550 by messages 522 and 524, between T/4 and T/2. The VPNN 550 may then determine that this subsequent request is not the first request for the PMC during this LCR interval of duration T. In this case, the VPNN 550 will direct the CPEs involved to coordinate LCR distribution of the PMC from one CPE device to another.

As shown in FIG. 5, the VPNN 550 sends messages 526 and 528 to the CPE1 540 through the DNN 548, between T/2 and 3T/4. Although FIG. 5 illustrates the VPNN 550 coordinating the LCR distribution by sending the messages 526 and 528, other embodiments may delegate the management of LCR distribution to the DNN 548 or to the VS 552 or to another network element not depicted in FIG. 5. The messages 526 and 528 inform the DNN 548 and the CPE1 540 that the subsequent request has been served to at least one previous requestor during the current LCR interval of duration T and indicate the identity of the previous requestor, which is the immediately preceding requestor in some embodiments.

The DNN 548 determines from the messages 526 and 528 that the second PMC request may be served to the CPE2 544 by the CPE1 540 without the use of a helper VP, such as VP1 542 and VP2 546. In this example, the uplink capacity of the CPE1 540 is sufficient to deliver the PMC to the CPE2 544 without using the uplink capacity of VP1 542, which simplifies the delivery of the PMC. In this example, the CPE1 540 begins to deliver the PMC to the CPE2 544 through the intervening DNN 548 as represented by arrow 530, between T/2 and 3T/4 and by arrow 532, between 3T/4 and T. It will be appreciated by those skilled in networked data transfer that the second request for the PMC is effectively served by the first requestor of the PMC. Moreover, the PMC delivery that occurs does not require use of network elements more upstream than the access network 130 of FIG. 1. For example, the VPNN 550 that directs the CPE1 540 to coordinate LCR distribution of the PMC from the CPE1 540 to the CPE2 544 is included in the access network 130.

Figure 6:
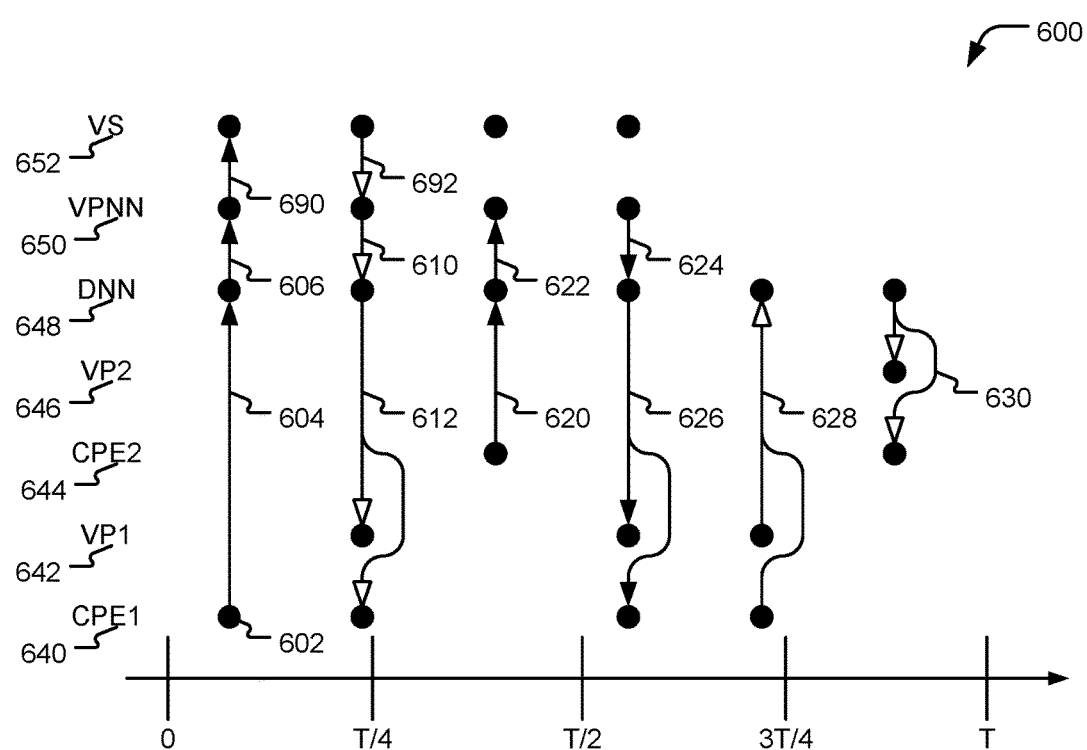
FIG. 6 depicts an embodiment of LCR distribution involving a helper virtual peer.

Referring to FIG. 6, an illustration of LCR distribution that does involve a helper VP is depicted and generally designated 600. In FIG. 6, lines terminating in black arrowheads represent message transfers while lines terminating in white arrowheads represent multimedia content transfers. The CPE1 640 issues a PMC request 602 that is the first PMC request of the current LCR interval of duration T, the PMC request 602 occurring before T/4. The uplink capacity of the CPE1 640 or another device that participates in the PMC transfer is measured and it is determined that the bandwidth constraints are too severe. The sequence 600 addresses this scenario by identifying and selecting a helper VP (e.g., VP1 642) from a pool of available helper VPs in response to the PMC request. The selection of helper VPs may be facilitated by selecting helper VPs based on availability factors, capacity factors, current or recent activity factors, and so forth.

The PMC request is routed by multimedia servers to VS 652 via DNN 648 and VPNN 650 as represented by the arrows 604, 606, and 690. The VS 652 responds to the PMC request and the helper VP selection by delivering the PMC to the VP1 642 as well as to the CPE1 640 by arrows 692, 610, and 612, also occurring before T/4. The arrow 612 illustrates content transfer that occurs by multicasting to the CPE1 640 and the VP1 642.

When a second request for the PMC is detected within the same LCR interval of duration T as the first request, CPE2 644 transmits the second request to the VPNN 650 using messages 620 and 622, occurring between T/4 and T/2. The VPNN 650 determines that this subsequent request for the PMC may be serviced by downstream elements because the PMC has been stored on the CPE1 640 and the VP1 642. Accordingly, the VPNN 650 sends a message to the CPE1 640 and the VP1 642 via arrows 624 and 626, between T/2 and 3T/4, indicating the identity of the second requestor, the CPE2 644. The CPE1 640 and the VP1 642 respond by cooperatively or jointly transmitting content 628, between T/2 and 3T/4, from the CPE1 640 and the VP1 542 through the DNN 648 and then delivering 630, between 3T/4 and T, the content to the CPE2 644 and to a newly selected helper VP, VP2 646. The VP2 646 represents the helper VP that may help deliver content to a third requestor of the PMC during the current LCR interval of duration T. In this example, unlike the example shown in FIG. 5, the uplink capacity of the CPE1 640 is insufficient to deliver the PMC to the CPE2 644 without using the uplink capacity of the first virtual peer VP1 642. The uplink capacity of the first virtual peer VP1 642 may be used to help deliver the PMC to the CPE2 644 and to the second virtual peer VP2 646. In this way, the PMC may be delivered despite the insufficient uplink capacity of the CPE1 640.

Figure 7:
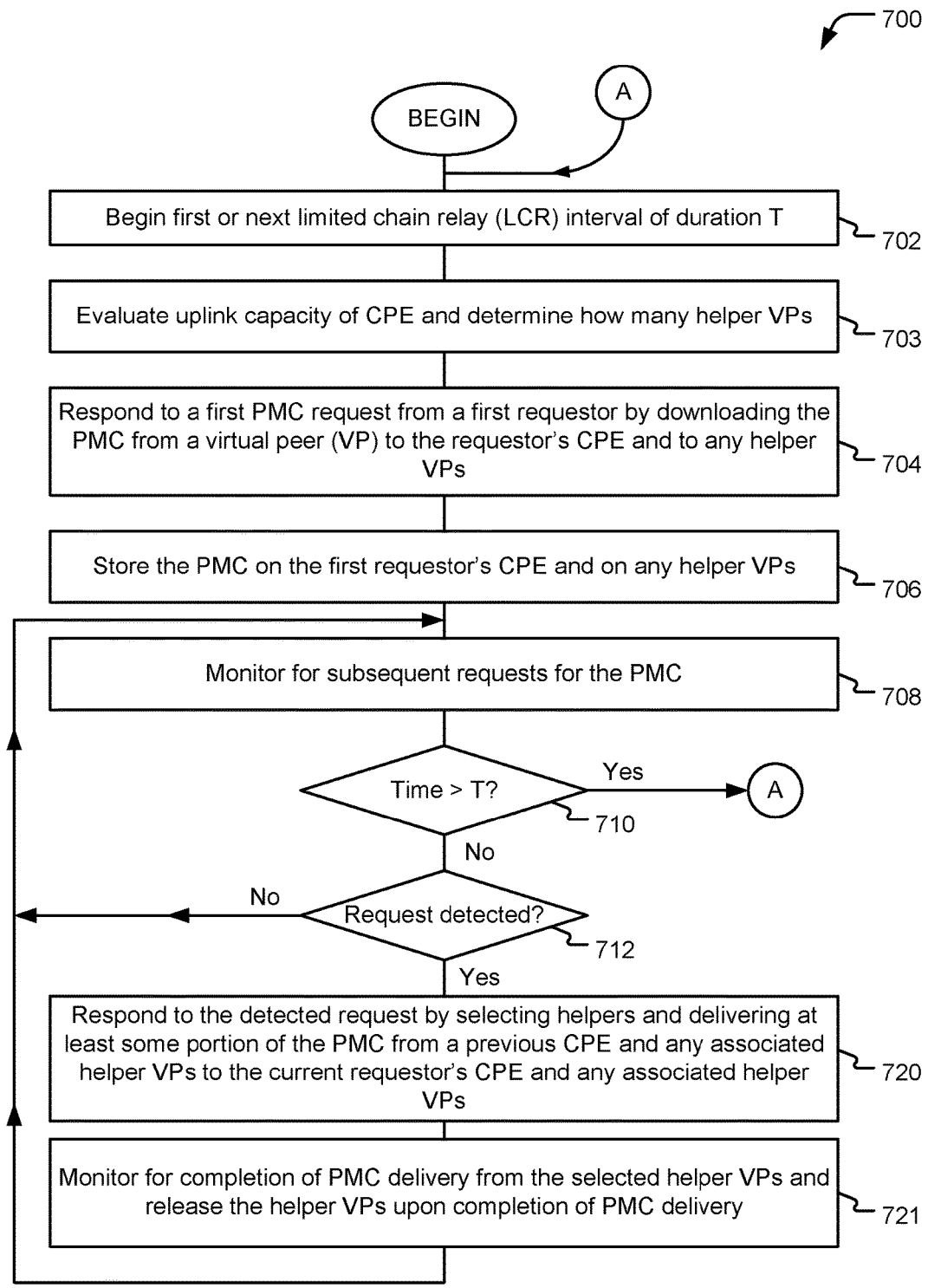
FIG. 7 is a flow diagram of a particular embodiment of a method of distributing multimedia content.

Referring to FIG. 7, a flow diagram of selected elements of a particular embodiment of a method of distributing multimedia content is depicted and generally designated 700. The method 700 emphasizes LCR distribution of multimedia content with or without the use of helper VPs. In some embodiments, the method 700 is illustrative of computer executable instructions that are stored in or otherwise embedded in a computer readable medium such as the computer readable medium of the DNN 120 of FIG. 1, the VP 190, or other network resource suitable for managing LCR chaining.

The method 700 segments time into intervals of a predetermined duration T. The method 700 is an iterative method that repeats on each successive interval. The time intervals may be referred to as LCR intervals. For example, FIG. 5 and FIG. 6 illustrate activities that occur within an LCR interval of duration T.

In block 702, an initial or a subsequent time interval of duration T is begun. As part of the start of a new LCR interval, the method 700 includes, at block 703, evaluating the uplink capacity of the CPE device to determine whether helper VPs are going to be necessary to achieve adequate bandwidth for chain relaying distribution. If the uplink capacity of the CPE device is insufficient to deliver a particular program of multimedia content (PMC), one or more helper VPs may be needed to help deliver the PMC, as in the example of FIG. 6. In some embodiments, link capacity is evaluated only after receiving a request for content. These embodiments have the benefit of knowing precisely which CPE device is being employed and the uplink evaluation may occur on the CPE device of interest. In other embodiments, the uplink capacity is evaluated based on an exemplary or typical CPE device. The uplink evaluation may return information including information indicative of how many helper VPs might be needed. Additional details of the uplink evaluation 703 are described below with respect to FIG. 8.

After initializing the LCR interval and evaluating the CPE device uplink capacity, the method 700 includes detecting a first end user request for a specific PMC and, in response downloading the PMC from a video server via a virtual peer located at a network node to the requestor's CPE device and to any helper VPs as needed, at 704. If no helper VPs are needed, the PMC is downloaded to the requestor's CPE device. The downloaded PMC is stored on the first requestor's CPE device and on any helper VPs as needed, at 706. If no helper VPs are needed, the PMC is stored on the requestor's CPE device.

If the method 700 has determined in block 703 that one or more helper VPs would be needed to support LCR distribution of multimedia content, block 704 would include selecting any needed helper VPs from a pool of available helper VPs and delivering at least some portion of the PMC to the one or more helper VPs. When helper VPs are involved in the LCR distribution, delivering a PMC to a requesting CPE device and to one or more helper VPs may include multicasting the PMC to the requestor and the one or more helper VPs.

After servicing the initial request for content, the method 700 includes monitoring the CPE devices 140 of FIG. 1 for a subsequent request for the PMC, at 708. If the current LCR interval expires, at 710, before a subsequent request for the PMC is detected, the method 700 returns to block 702 where a new LCR interval is initiated. If, in block 710, the current LCR interval has not expired, the method 700 determines, at block 712, whether a subsequent request for the PMC has been detected. If a subsequent request for the PMC has not been detected, the method 700 returns to block 708. If a subsequent request for the PMC has been detected, the method 700 responds to the subsequent request in block 720 by selecting helper VPs, if necessary, and delivering at least some of the PMC from a previous CPE device and from any helper VPs that were associated with the previous requestor's CPE device to the current requestor's CPE device and to any helper VPs that are associated with the current requestor's CPE device. It should be noted that different resources may send content at different rates to the next successive requestor. For example, a CPE device receiving content from the previous requestor CPE device and two helper VPs may obtain 70% of the content from the first helper VP, 20% of the content from the second helper VP, and 10% of the content from the previous requestor CPE device.

In block 721, the method 700 monitors for completion of the delivery of content by the one or more selected helper VPs associated with a previous requestor CPE device and, when delivery is complete, releases the applicable helper VPs back into the helper VP pool where the helper VPs are available to help subsequent requestor CPEs. By releasing and recycling helper VPs as soon as possible, as soon as the helper VPs have delivered the necessary content to the current requestor CPE, the method 700 may be able to operate with fewer total helper VPs than otherwise.

The delivery of multimedia content in block 720 from one CPE device to another CPE device occurs over downstream portions of the multimedia distribution network 100 of FIG. 1. Specifically, intra-CPE content delivery occurs on portions of the multimedia distribution network 100 that are downstream of the video servers UVS 102 and DVS 110. By delegating content transfer to downstream portions of the multimedia distribution network 100, LCR distribution of content beneficially conserves bandwidth and processing resources of the video servers, thereby enabling the video servers to serve a greater number of content requests at lower processing overhead. In come embodiments, LCR distribution of content between CPE devices may still require administrative participation of a video server or a virtual peer. For example, a video server or a virtual peer may be required to respond to subsequent content requests by coordinating messages to the DNNs 120 of FIG. 1 and the CPE devices 140 to facilitate the intra-CPE content transfer.

Figure 8:
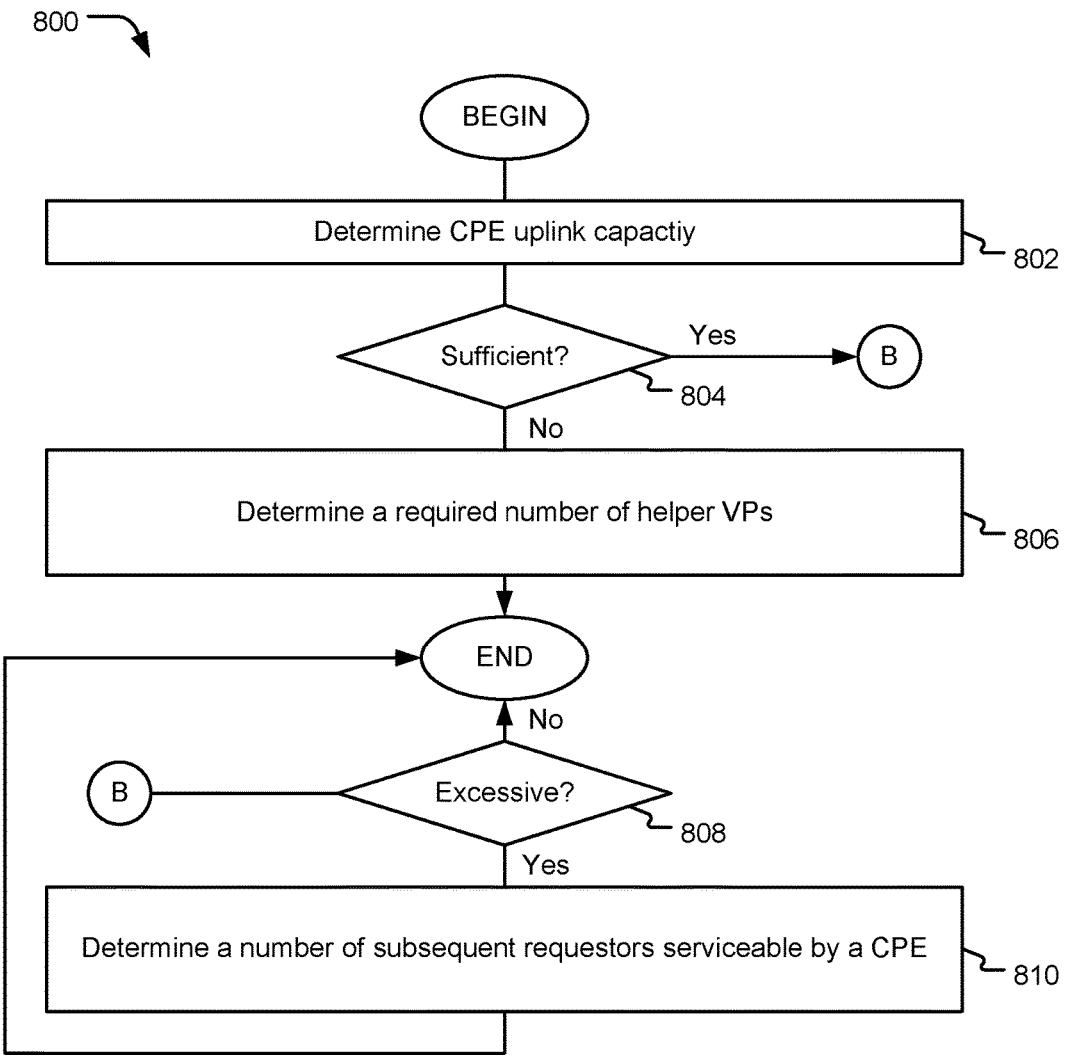
FIG. 8 is a flow diagram of a particular embodiment of a method of evaluating an uplink of a CPE device.

Referring to FIG. 8, a flow diagram of selected elements of a particular embodiment of a method of evaluating an uplink of a CPE device is depicted and generally designated 800, corresponding to block 703 in FIG. 7. The uplink evaluation method 800 includes determining an uplink capacity of the CPEs and the DNNs, at 802. If the uplink capacity is sufficient in block 804, then the uplink evaluation method 800 determines, at 808, whether the CPE device uplink capacity is excessive such that the uplink bandwidth capacity exceeds the bandwidth requirement needed to transfer multimedia content. If the CPE device uplink capacity is excessive, the number of subsequent requestors that a single uplink may service is determined, at 810, and the uplink evaluation method 800 terminates. If the CPE device uplink capacity is not excessive, the uplink evaluation method 800 terminates. If the uplink capacity is not sufficient in block 804, the uplink evaluation method 800 includes determining, at 806, a required number of helper VPs to be used and then the uplink evaluation method 800 terminates.

Figure 9:
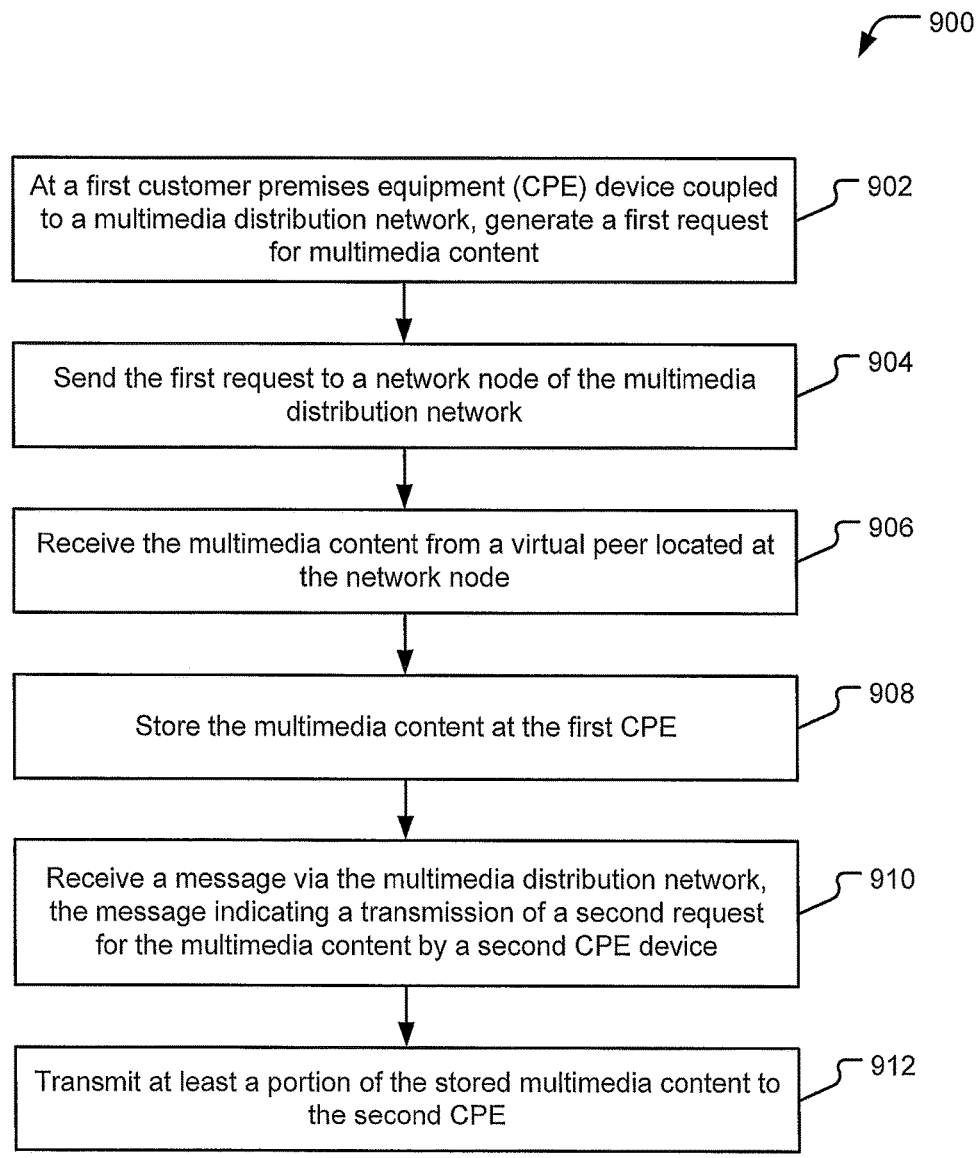
FIG. 9 is a flow diagram of a particular embodiment of a method of providing a limited chain relay (LCR) with at least one virtual peer for multimedia distribution.

Referring to FIG. 9, a flow diagram of selected elements of a particular embodiment of a method of providing a limited chain relay (LCR) with at least one virtual peer for multimedia distribution is illustrated and is generally designated 900. The method 900 includes at first customer premises equipment (CPE) coupled to a multimedia distribution network, generating a first request for multimedia content, at 902. For example, at a first CPE device 140 of FIG. 1 coupled to the multimedia distribution network 100, a first request for multimedia content may be generated. The method 900 also includes sending the first request to a network node of the multimedia distribution network, at 904. For example, the first request for multimedia content may be sent to a DNN 120 of FIG. 1.

The method 900 further includes receiving the multimedia content from a virtual peer located at the network node, at 906, and storing the multimedia content at the first CPE, at 908. For example, the multimedia content may be received from a VP 190 of FIG. 1 located at the DNN 120 and the multimedia content may be stored at the first CPE device 140 in the storage 210 of FIG. 2. The method 900 also includes receiving a message via the multimedia distribution network, the message indicating a transmission of a second request for the multimedia content by a second customer premises equipment (CPE) device, at 910. For example, a message may be received via the multimedia distribution network 100 of FIG. 1, the message indicating a transmission of a second request for the multimedia content by a second CPE device 140.

The method 900 further includes transmitting at least a portion of the stored multimedia content to the second CPE, at 912. For example, at least a portion of the multimedia content stored at the first CPE device 140 of FIG. 1 in the storage 210 of FIG. 2 may be transmitted to the second CPE device 140 via a router 122 of one of the DNNs 120.

In a particular embodiment, the VP 190 of FIG. 1 includes the processor 401 of FIG. 4, a computer readable storage medium, such as the storage 410, accessible to the processor 401, and a network interface, such as the network adapter 420, for receiving the multimedia content. The storage 410 includes instructions including an LCR application, such as the LCR client application 414. In alternative embodiments, the LCR application may be included in the LCR logic module 490. The LCR application enables the VP 190 to receive the multimedia content from a server, such as the DVS 110, and store the multimedia content in the storage 410, receive the first request for the multimedia content by the first CPE device 140, and transmit the multimedia content to the first CPE device 140. In a particular embodiment, the VP 190 at the DNN 120 emulates the first CPE device and executes the LCR application. In a particular embodiment, the VP 190 at the DNN 120 appears to the first CPE device 140 to be another customer premises equipment (CPE) device (i.e., another peer) executing the LCR application.

In an alternative embodiment, the VP 190 is a process (computer program/process/thread) implementing an LCR algorithm. The VP 190 may be created and destroyed as needed, particularly when the VP 190 is a process. For example, with each arrival of a request for multimedia content, a VP 190 may be created at the DNN 120, or at an adjunct thereof, implementing an LCR algorithm to handle the peer functions to patch the next arrival, if any, of a request for the same multimedia content. The created VP 190 will be finished handling the peer functions of patching by the end of the next LCR interval of duration T after the VP 190 was created, because the maximum time in which patching is done is one LCR interval of duration T. In a particular embodiment, all patching in an LCR algorithm is handled by the VP 190 and no real peer is involved in the patching process, removing dependence on the CPE device 140. The residence of the VP 190 at the DNN 120 allows the VP 190 to communicate with the network adapter at high speed, removing the bandwidth-related issues of a real peer. The ability to implement an LCR algorithm in the DNN 120 through the VPs 190 also provides the ability to benefit from concurrence of demands for the same multimedia content because the DNNs 120 have better connectivity between each other, in terms of available bandwidth and the like, than real peers. A P2P implementation of an LCR algorithm may be hampered because the DSLAMs are not generally interconnected, with each DSLAM having a small number of customers to obtain a required concurrency of demands, and even when DSLAMs are connected, two access links may have to be used to effect patching to a peer residing under a different DSLAM.

In a particular embodiment, the CPE device 140 of FIG. 1 is a set-top box device (STB). In a particular embodiment, transmitting at least a portion of the stored multimedia content from the first CPE device 140 to the second CPE device 140 includes routing at least a portion of the stored multimedia content through the DNN 120, via the router 122, to the second CPE device 140. In a particular embodiment, the DNN 120 comprises one of a central office (CO) node and a digital subscriber line access multiplexer (DSLAM) node.

In a particular embodiment, a connection between the first CPE device 140 of FIG. 1 and the DNN 120 includes a downlink and an uplink. In such an embodiment, the method 900 further includes, whenever a bandwidth capacity of the uplink is less than a predetermined threshold, determining a number of first helper VPs 190 needed to transmit the multimedia content, selecting the first helper VPs 190 from a pool of available helper VPs 190, transmitting at least some of the multimedia content from the VP 190 to the selected first helper VPs 190, and storing at least some of the multimedia content at the selected first helper VPs 190. Transmitting at least a portion of the stored multimedia content to the second CPE device 140 further includes transmitting at least some of the stored multimedia content from the selected first helper VPs 190 to the second CPE device 140.

In such an embodiment, the method 900 further includes selecting a number of second helper VPs 190 of FIG. 1 and transmitting at least some of the stored multimedia content to the second helper VPs 190. In such an embodiment, the method 900 further includes maintaining the pool of available helper VPs 190 and selecting at least one helper VP 190 from the pool.

Selecting at least one helper VP 190 of FIG. 1 may include selecting at least one helper VP 190 based, at least in part, on an expected utilization of some of an uplink capacity of at least one helper VP 190. A maximum uplink capacity of the first CPE device 140 may be M1, a maximum uplink capacity of a first helper VP 190 may be M2, and an uplink capacity to deliver the multimedia content to the second CPE device 140 may be K and the number of first helper VPs 190 may be determined based, at least in part, on M1, M2, and K. For example, when M1 is substantially equal to M2, a minimum number of first helper VPs 190 may be greater than or equal to (K/M1)−1. If K is substantially equal to M1, a minimum number of first helper VPs 190 may be zero and no first helper VPs 190 may be needed. A number of first helper VPs 190 exceeding the minimum may be selected where at least some of the selected first helper VPs 190 may be used to provide redundancy in case of a failure of another first helper VP 190.

In embodiments where helper VPs 190 of FIG. 1 may be needed, the first CPE device 140 and the second CPE device 140 may be limited to storing only a portion of the multimedia content. In a particular embodiment, the multimedia content includes video-on-demand (VOD) content. In a VOD offering, stream control events, such as fast forward, rewind, replay, skip and the like, are generated from user interactions. A VP implementation of an LCR algorithm facilitates stream control operations. For example, a fast forward operation would seek to the correct time segment of a movie provided by a VP and uploaded to the requesting client. A VP implementation of an LCR algorithm makes this operation more efficient because the multimedia content being sought is in a disk cache situated at a central office (CO), for example.

The CPE device 140 of FIG. 1 may include the processor 201 of FIG. 2, a computer readable storage medium, such as the storage 210, accessible to the processor 201, a network interface, such as the network adapter 220, for receiving the multimedia content, and the decoder 240 for processing the multimedia content received via the network interface. The storage 210 includes instructions including an LCR application, such as the LCR client application 214. In alternative embodiments, the LCR application may be included in the LCR logic module 290. The LCR application enables the CPE device 140 to generate a first request for the multimedia content and send the first request to the VP 190 via the DNN 120 of the multimedia content distribution network 100 coupled to a server, such as the DVS 110, receive the multimedia content from the VP 190 via the DNN 120 and store the received multimedia content, receive a message indicating a transmission of a second request for the multimedia content by the second CPE device 140, and, in response to receiving the message, transmit at least a portion of the stored multimedia content to the second CPE device 140 via the DNN 120.

In a particular embodiment, when an uplink capacity of a connection between the CPE device 140 and the DNN 120 is less than a predetermined capacity necessary to sustain video content delivery, the CPE device 140 is further configured to respond to the second request by selecting one or more first helper VPs 190 from a pool of available helper VPs 190 and transmitting at least a portion of the stored multimedia content to the second CPE device 140 and to at least one second helper VP 190. In a particular embodiment, selecting one or more first helper VPs 190 includes selecting one or more wireless first helper VPs 190.

The DNN 120 of FIG. 1 may include the processor 301 of FIG. 3, a computer readable storage medium, such as the storage 310, accessible to the processor 301, and a network interface, such as the NIC 320, for receiving the multimedia content. The storage 310 includes instructions including an LCR distribution application, such as the LCR distribution app 350. In alternative embodiments, the LCR distribution application may be included in the LCR logic module 390. The LCR distribution application enables the DNN 120 to determine a beginning and ending of successive LCR time intervals, responsive to detecting a first request during a first LCR time interval, where the first request is for the multimedia content, transmit at least a portion of the multimedia content to the first CPE device 140, and, responsive to detecting a second request during the first LCR time interval, where the second request is also for the multimedia content, send a message to the first CPE device 140 instructing the first CPE device 140 to transmit at least a portion of the multimedia content from the first CPE device 140 to the second CPE device 140. In a particular embodiment, at least one VP 190 is located at the DNN 120.

Figure 10:
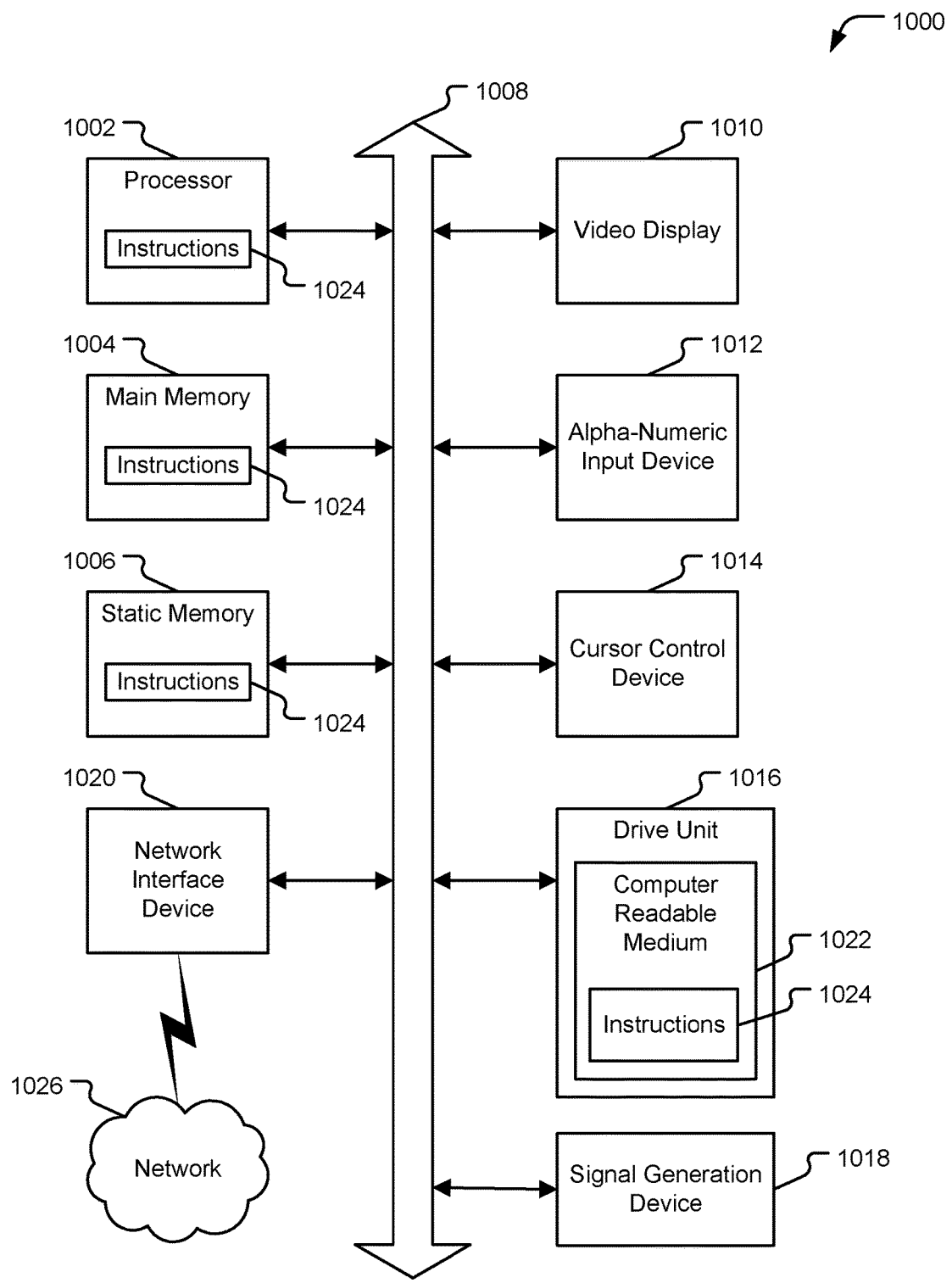
FIG. 10 is a block diagram of an illustrative embodiment of a general computer system.

Referring to FIG. 10, an illustrative embodiment of a general computer system is shown and is designated 1000. The computer system 1000 includes a set of instructions that can be executed to cause the computer system 1000 to perform any one or more of the methods or computer based functions disclosed herein. The computer system 1000, or any portion thereof, may operate as a standalone device or may be connected, e.g., using a network, to other computer systems or peripheral devices.

In a networked deployment, the computer system 1000 may operate in the capacity of a set-top box device, a server, or a mobile computing device, such as the UVS 102 of FIG. 1, the DVSs 110 of FIG. 1, the DNNs 120 of FIG. 1 and FIG. 3, the VPs 190 of FIG. 1 and FIG. 4, the CPE devices 140 of FIG. 1 and FIG. 2, the backbone network 104 of FIG. 1, the access network 130 of FIG. 1, and the home network 150 of FIG. 1. The computer system 1000 can also be implemented as or incorporated into various devices, such as a personal computer (PC), a tablet PC, a personal digital assistant (PDA), a mobile device, a palmtop computer, a laptop computer, a desktop computer, a communications device, a web appliance, or any other machine capable of executing a set of instructions (sequential or otherwise) that specify actions to be taken by that machine. In a particular embodiment, the computer system 1000 can be implemented using electronic devices that provide voice, video or data communication. Further, while a single computer system 1000 is illustrated, the term "system" shall also be taken to include any collection of systems or sub-systems that individually or jointly execute a set, or multiple sets, of instructions to perform one or more computer functions.

As illustrated in FIG. 10, the computer system 1000 may include a processor 1002, e.g., a central processing unit (CPU), a graphics-processing unit (GPU), or both. Moreover, the computer system 1000 can include a main memory 1004 and a static memory 1006 that can communicate with each other via a bus 1008. As shown, the computer system 1000 may further include or be coupled to a video display unit 1010, such as a liquid crystal display (LCD), an organic light emitting diode (OLED), a flat panel display, a cathode ray tube (CRT) display, a solid-state display, or a projection display. Additionally, the computer system 1000 may include an input device 1012, such as a keyboard, a remote control device, and a cursor control device 1014, such as a mouse. The computer system 1000 can also include a disk drive unit 1016, a signal generation device 1018, such as a speaker or remote control device, and a network interface device 1020. The network interface device 1020 may be coupled to other devices (not shown) via a network 1026.

In a particular embodiment, as depicted in FIG. 10, the disk drive unit 1016 may include a computer-readable medium 1022 in which one or more sets of instructions 1024, e.g., software, can be embedded. Further, the instructions 1024 may embody one or more of the methods or logic as described herein. In a particular embodiment, the instructions 1024 may reside completely, or at least partially, within the main memory 1004, the static memory 1006, and/or within the processor 1002 during execution by the computer system 1000. The main memory 1004 and the processor 1002 also may include computer-readable media.

In an alternative embodiment, dedicated hardware implementations, such as application-specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/item distributed processing, and parallel processing. Alternatively, virtual computer system processing can be constructed to implement one or more of the methods or functionalities as described herein.

The present disclosure contemplates a computer-readable medium that includes instructions 1024 or receives and executes instructions 1024 responsive to a propagated signal, so that a device connected to a network 1026 can communicate voice, video, or data over the network 1026. Further, the instructions 1024 may be transmitted or received over the network 1026 via the network interface device 1020.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an email or other self-contained information archive or set of archives may be considered equivalent to a tangible storage medium. Accordingly, the disclosure is considered to include any one or more of a computer-readable storage medium and other equivalents and successor media, in which data or instructions may be stored.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories.

Although the present specification describes components and functions that may be implemented in particular embodiments with reference to particular standards and protocols, the invention is not limited to such standards and protocols. For example, standards for Internet, other packet switched network transmission (e.g., TCP/IP, UDP/IP, HTML, and HTTP) and standards for viewing media content (e.g., MPEG, SMPTE, and H.264) represent examples of the state of the art. Such standards are periodically superseded by faster or more efficient equivalents having essentially the same functions. Accordingly, replacement standards and protocols having the same or similar functions as those disclosed herein are considered equivalents thereof.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
    evaluating a bandwidth capacity of an uplink between a first customer premises equipment device and a network node of a multimedia distribution network;
    transmitting a portion of multimedia content from the first customer premises equipment device to a second customer premises equipment device; and
    responsive to determining that the bandwidth capacity of the uplink is greater than a threshold:
        determining a number of subsequent requestors that the first customer premises equipment device is capable of servicing;
        selecting a first set of helper virtual peers from a pool of available helper virtual peers based on the number of subsequent requestors; and
        transmitting the multimedia content from the first customer premises equipment device to the first set of helper virtual peers.

2. The method of claim 1, further comprising:
    responsive to determining that the bandwidth capacity of the uplink is less than the threshold:
        selecting a second set of helper virtual peers from the pool of available helper virtual peers; and
        initiating transmission of the multimedia content from the network node to the second set of helper virtual peers.

3. The method of claim 2, further comprising:
    transmitting the multimedia content from the second set of helper virtual peers and the first customer premises equipment device to the second customer premises equipment device; and transmitting the multimedia content from the second set of helper virtual peers and the first customer premises equipment device to a particular helper virtual peer distinct from the second set of helper virtual peers.

4. The method of claim 2, further comprising:
selecting a particular helper virtual peer from the pool; and
releasing the particular helper virtual peer back to the pool after the particular helper virtual peer completes transmitting the multimedia content to the second customer premises equipment device.

5. The method of claim 2, wherein the second set of helper virtual peers is selected based on a first maximum uplink capacity of the first customer premises equipment device, a second maximum uplink capacity of a particular helper virtual peer, and an uplink capacity to deliver the multimedia content to the second customer premises equipment device.

6. The method of claim 1, wherein, responsive to determining that an uplink capacity of a connection between the first customer premises equipment device and the network node is less than a threshold capacity to sustain video content delivery, the network node selects a second helper virtual peer from the pool of available helper virtual peers and the second helper virtual peer transmits a first portion of the multimedia content to the second customer premises equipment device and to a third helper virtual peer.

7. The method of claim 1, further comprising receiving a message at the first customer premises equipment device from the network node, the message indicating a request for the multimedia content by the second customer premises equipment device, and instructing the first customer premise equipment device to provide the multimedia content to the second customer premise equipment device.

8. The method of claim 1, wherein the first customer premises equipment device comprises a set-top box device.

9. The method of claim 1, wherein transmitting the portion of the multimedia content from the first customer premises equipment device to the second customer premises equipment device includes routing the portion of the multimedia content through the network node to the second customer premises equipment device.

10. The method of claim 1, wherein the network node comprises a central office node.

11. The method of claim 1, further comprising determining a minimum number of helper virtual peers such that a sum of a first uplink capacity of the first customer premises equipment device to deliver the multimedia content and a second uplink capacity of the minimum number of helper virtual peers to deliver the multimedia content is substantially equal to a downlink capacity of the second customer premises equipment device to receive the multimedia content, wherein the downlink capacity is greater than the first uplink capacity.

12. The method of claim 1, wherein the network node comprises a digital subscriber line access multiplexer node.

13. The method of claim 1, further comprising sending a request for multimedia content from the first customer premises equipment device to the network node.

14. The method of claim 13, further comprising storing the multimedia content received at the first customer premises equipment device from the network node in response to the request.

15. A computer-readable memory device storing instructions that, when executed by a processor of a first customer premises equipment device, cause the processor to perform operations comprising:
evaluating a bandwidth capacity of an uplink to a network node of a multimedia distribution network;
transmitting a portion of multimedia content to a second customer premises equipment device; and
responsive to determining that the bandwidth capacity of the uplink is greater than a threshold:
determining a number of subsequent requestors that the processor is capable of servicing;
selecting a first set of helper virtual peers from a pool of available helper virtual peers based on the number of subsequent requestors; and
transmitting the multimedia content to the first set of helper virtual peers.

16. The computer-readable memory device of claim 15, wherein the operations further comprise:
responsive to determining that the bandwidth capacity of the uplink is less than the threshold:
selecting a second set of helper virtual peers from the pool of available helper virtual peers; and
initiating transmission of the multimedia content from the network node to the second set of helper virtual peers.

17. A customer premises equipment device comprising:
a processor and a computer readable storage device accessible to the processor; and
a network interface configured to receive multimedia content;
wherein the computer readable storage device includes instructions comprising a limited chain relay application, the limited chain relay application executable by the processor to:
evaluate a bandwidth capacity of an uplink between the processor and a network node of a multimedia content distribution network;
transmit a first portion of multimedia content to a second customer premises equipment device via the network node; and
responsive to determining that the bandwidth capacity of the uplink is greater than a threshold:
determine a number of subsequent requestors that the processor is capable of servicing;
select a first helper virtual peer from a pool of available helper virtual peers based on the number of subsequent requestors; and
transmit the multimedia content to the first helper virtual peer.

18. The customer premises equipment device of claim 17, wherein, responsive to determining that an uplink capacity of a connection between the network interface and the network node is less than a threshold capacity to sustain video content delivery, the network node selects a second helper virtual peer from the pool of available helper virtual peers and the second helper virtual peer transmits the first portion of the multimedia content to the second customer premises equipment device and to a third helper virtual peer.

19. The customer premises equipment device of claim 18, wherein the second helper virtual peer comprises a wireless helper virtual peer.

20. The customer premises equipment device of claim 17, wherein the network node comprises:
a second processor and a second storage device accessible to the second processor; and
a second network interface configured to receive the multimedia content;

wherein the second storage device includes instructions that, when executed by the second processor, cause the second processor to perform second operations comprising:
receiving the multimedia content from a server and storing the multimedia content in the second storage device;
transmitting the multimedia content to the processor in response to a second request for the multimedia content by the processor; and
after transmitting the multimedia content, sending a message to the processor.

* * * * *